United States Patent
Mohammed et al.

(10) Patent No.: US 9,058,056 B2
(45) Date of Patent: Jun. 16, 2015

(54) SYSTEM AND METHOD OF DYNAMICALLY GENERATING A FREQUENCY PATTERN TO REALIZE THE SENSE OF TOUCH IN A COMPUTING DEVICE

(71) Applicant: International Business Machines Corporation, Armonk, NY (US)

(72) Inventors: Siddique Mohammed, Bangalore (IN); Dhandapani Shanmugam, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/967,434

(22) Filed: Aug. 15, 2013

(65) Prior Publication Data

US 2014/0168114 A1    Jun. 19, 2014

Related U.S. Application Data

(63) Continuation of application No. 13/854,220, filed on Apr. 1, 2013.

(60) Provisional application No. 61/738,005, filed on Dec. 17, 2012.

(51) Int. Cl.
*G06F 3/01* (2006.01)

(52) U.S. Cl.
CPC ..................................... *G06F 3/016* (2013.01)

(58) Field of Classification Search
CPC ..................................................... G06F 3/016
USPC ................................................ 345/173–178
See application file for complete search history.

(56) References Cited

U.S. PATENT DOCUMENTS

| | | |
|---|---|---|
| 5,165,897 A | 11/1992 | Johnson |
| 5,574,576 A | 11/1996 | Martin |
| 5,984,880 A | 11/1999 | Lander et al. |
| 6,402,620 B1 | 6/2002 | Naghi |
| 6,424,333 B1 | 7/2002 | Tremblay et al. |
| 7,046,151 B2 | 5/2006 | Dundon |

(Continued)

FOREIGN PATENT DOCUMENTS

| | | |
|---|---|---|
| EP | 1521434 A1 | 4/2005 |
| JP | 10287189 | 10/1998 |

(Continued)

OTHER PUBLICATIONS

K. Nakajima et al., "FuSA2 Touch Display," ACM SIGGRAPH Emerging Technologies, Jul. 2010, 1 page.

(Continued)

*Primary Examiner* — Andrew Sasinowski
(74) *Attorney, Agent, or Firm* — Anne V. Dougherty; Ryan, Mason & Lewis, LLP

(57) ABSTRACT

Systems and methods for providing tactile feedback. A method for providing tactile feedback, comprises extracting a plurality of features from a visual representation of a physical object, wherein the extracting is performed using at least one image processing technique, generating a variable frequency pattern corresponding to the extracted features, sending the variable frequency pattern to a computing device, and generating the tactile feedback via the computing device in response to a stimulation applied by a user, wherein the tactile feedback is based on the variable frequency pattern.

12 Claims, 6 Drawing Sheets

(56) References Cited

U.S. PATENT DOCUMENTS

| | | | |
|---|---|---|---|
| 7,227,968 | B2 | 6/2007 | van Halteren et al. |
| 7,562,816 | B2 | 7/2009 | Abraham et al. |
| 7,723,896 | B2 | 5/2010 | Esashi et al. |
| 8,040,345 | B2 | 10/2011 | Faken et al. |
| 8,159,461 | B2 | 4/2012 | Martin et al. |
| 8,174,372 | B2 | 5/2012 | da Costa |
| 8,201,850 | B2 | 6/2012 | Browne et al. |
| 8,207,832 | B2 | 6/2012 | Yun et al. |
| 8,244,211 | B2 | 8/2012 | Clark |
| 8,253,703 | B2 | 8/2012 | Eldering |
| 8,264,465 | B2 | 9/2012 | Grant et al. |
| 8,274,376 | B2 | 9/2012 | Shields et al. |
| 8,369,887 | B2 | 2/2013 | Choe et al. |
| 8,427,433 | B2 | 4/2013 | Edwards et al. |
| 8,866,600 | B2 | 10/2014 | Yang et al. |
| 2002/0046020 | A1 | 4/2002 | Ishibashi et al. |
| 2002/0094755 | A1 | 7/2002 | Amineh |
| 2002/0158836 | A1 | 10/2002 | Ishmael et al. |
| 2002/0191011 | A1 | 12/2002 | Rasouli |
| 2005/0097179 | A1 | 5/2005 | Ore |
| 2005/0275567 | A1 | 12/2005 | Depue et al. |
| 2006/0274036 | A1 | 12/2006 | Hioki et al. |
| 2008/0274769 | A1 | 11/2008 | Linden |
| 2008/0303782 | A1 | 12/2008 | Grant et al. |
| 2010/0073328 | A1 | 3/2010 | Lynch et al. |
| 2010/0141407 | A1 | 6/2010 | Heubel et al. |
| 2010/0149092 | A1 | 6/2010 | Westerman et al. |
| 2010/0231541 | A1 | 9/2010 | Cruz-Hernandez et al. |
| 2010/0311489 | A1 | 12/2010 | Miller et al. |
| 2010/0311490 | A1 | 12/2010 | Miller et al. |
| 2011/0001616 | A1 | 1/2011 | Nathan et al. |
| 2011/0152729 | A1 | 6/2011 | Oohashi et al. |
| 2011/0254671 | A1 | 10/2011 | Okimoto et al. |
| 2012/0028577 | A1* | 2/2012 | Rodriguez et al. ........... 455/41.1 |
| 2012/0162117 | A1 | 6/2012 | Wilson et al. |
| 2012/0206248 | A1 | 8/2012 | Biggs |
| 2012/0218091 | A1 | 8/2012 | Rothschild |
| 2012/0220311 | A1* | 8/2012 | Rodriguez et al. ......... 455/456.1 |
| 2012/0237043 | A1 | 9/2012 | Radivojevic et al. |
| 2012/0242687 | A1 | 9/2012 | Choi |
| 2013/0100046 | A1 | 4/2013 | Chuang et al. |
| 2013/0201115 | A1 | 8/2013 | Heubel |
| 2013/0201141 | A1* | 8/2013 | Birnbaum et al. ............ 345/173 |
| 2013/0335354 | A1 | 12/2013 | Zellers et al. |
| 2014/0002376 | A1 | 1/2014 | Oliver et al. |
| 2014/0168114 | A1 | 6/2014 | Mohammed et al. |

FOREIGN PATENT DOCUMENTS

| | | | |
|---|---|---|---|
| JP | 2002232317 A | | 8/2002 |
| WO | 03/014907 A1 | | 2/2003 |

OTHER PUBLICATIONS

PCT International Search Report and Written Opinion, dated May 23, 2014, for PCT Application PCT/US2013/061658.

PCT International Search Report and Written Opinion, dated Apr. 23, 2014, for counterpart PCT Application PCT/US2013/064767.

Senseg, "Senseg is Haptics Re-Imagined and Realized," http://senseg.com/technology/senseg-tecnology, Mar. 2013, 2 pages.

Hunter Sebresos, "Mobile Hapticons," Texture/Touch/Meaning, http://www.concepthunter.com/touch/hapticons.html, Mar. 2013, 2 pages.

Wikipedia, "Haptic Technology," http://www.en.wikipedia.org/wiki/Haptic_technology, Mar. 2013, 8 pages.

* cited by examiner

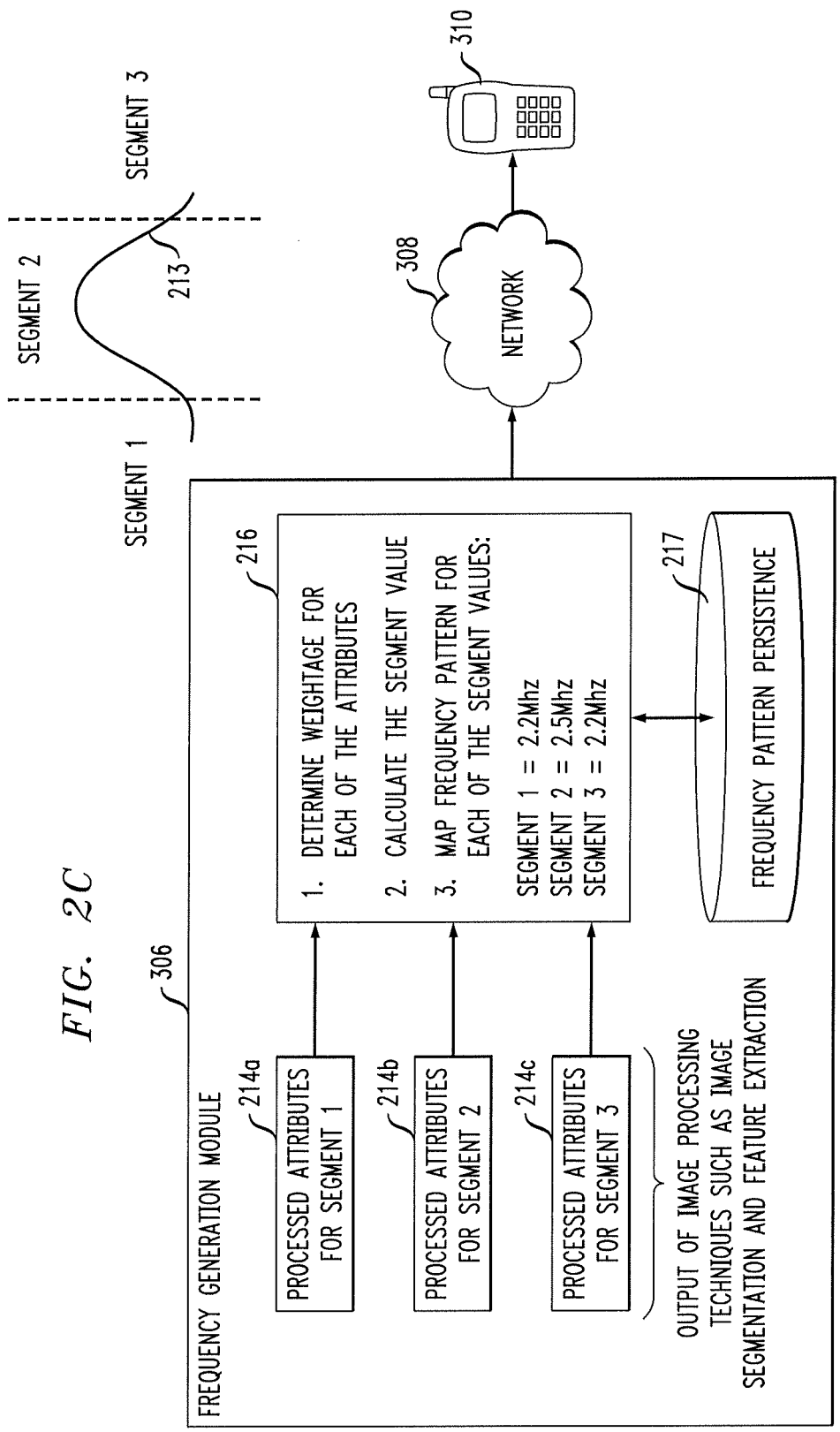

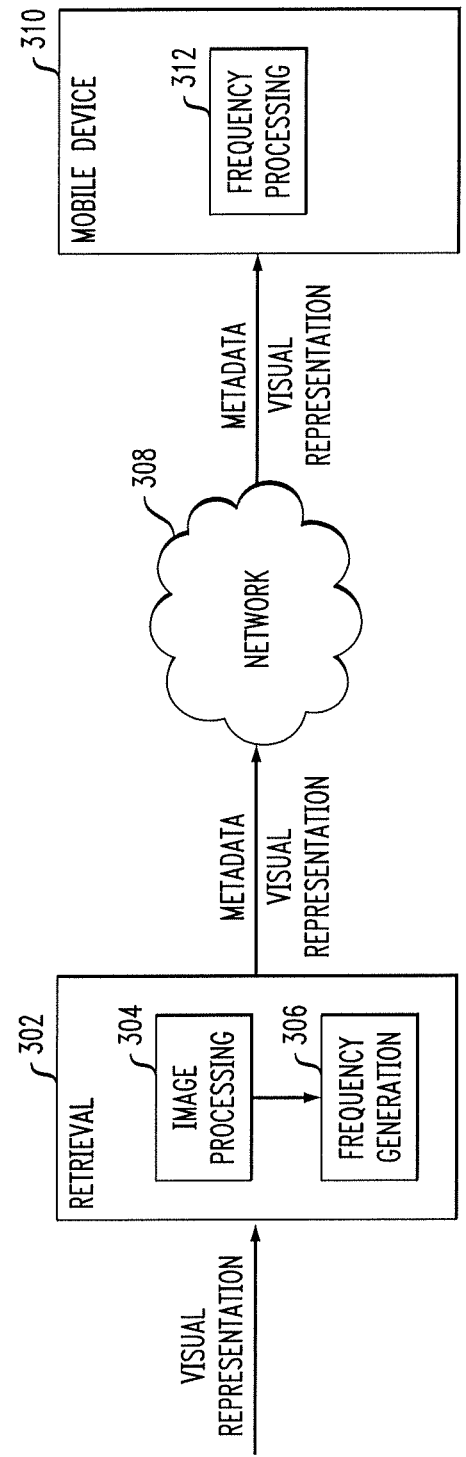

SYSTEM AND METHOD OF DYNAMICALLY GENERATING A FREQUENCY PATTERN TO REALIZE THE SENSE OF TOUCH IN A COMPUTING DEVICE

CROSS-REFERENCE TO RELATED APPLICATIONS

This application is a Continuation of U.S. application Ser. No. 13/854,220, filed on Apr. 1, 2013, which claims the benefit of U.S. Provisional Patent Application Ser. No. 61/738,005, filed on Dec. 17, 2012, the contents of which are each herein incorporated by reference in their entireties.

TECHNICAL FIELD

The field generally relates to a system and method for providing the sense of touch in a computing device, and, in particular, to a system and method for dynamically generating a frequency pattern to realize the sense of touch by leveraging vibration.

BACKGROUND

Online and mobile commerce has been increasing at a rapid pace from year to year, especially with the increasing adoption of mobile devices, such as, for example, smartphones and tablets. Using, for example, mobile phone or tablet applications, mobile web sites, or a combination thereof, shoppers are able to use online stores or shopping sites to search for, compare, examine, and purchase items using their mobile devices.

Using mobile devices to purchase goods permits a consumer to make purchase decisions at any time and any place, at his or her convenience. However, shopping online or with a mobile device also prevents a consumer from examining an article or physical object in person, not allowing the consumer to touch, feel, or try using the product, all of which can presently only be done in a store or similar physical setting where both the product and purchaser are present.

In addition, when practicing remote or tele-medicine, a doctor remains unable to feel a wound without being co-located with a patient.

Some of the restrictions of mobile and online commerce, or remote medicine have been addressed. For example, high-resolution, full-color displays on higher end devices, and increasingly on mid- and lower-level devices, make it possible to present very realistic images of an item or medical condition. Audio makes it possible to hear an object (for example, an engine or a musical instrument), or to hear a sales associate explaining an item. In addition, video makes it possible to see an item in action, or being used.

Haptic technology, or haptics, permits a user to receive tactile feedback to some degree through a device by applying forces, vibrations, and/or motions to the user. However, with current technology, the mobile and online consumer, or remote doctor still remains unable to accurately feel or simulate the feeling of touching a wound, scar, or a desired product, such as an article of clothing, when making a purchase.

SUMMARY

In general, exemplary embodiments of the invention include a system and method for providing the sense of touch in a computing device, and, in particular, to a system and method for dynamically generating a frequency pattern to realize the sense of touch by leveraging vibration.

According to an exemplary embodiment of the present invention, a system for providing tactile feedback comprises an image processing module capable of extracting a plurality of features from a visual representation of a physical object, wherein the extracting is performed using at least one image processing technique, and a frequency generation module capable of generating a variable frequency pattern corresponding to the extracted features, and sending the variable frequency pattern to a computing device, wherein the computing device generates the tactile feedback in response to a stimulation applied by a user, and the tactile feedback is based on the variable frequency pattern.

According to an exemplary embodiment of the present invention, a method for providing tactile feedback comprises extracting a plurality of features from a visual representation of a physical object, wherein the extracting is performed using at least one image processing technique, generating a variable frequency pattern corresponding to the extracted features, sending the variable frequency pattern to a computing device, and generating the tactile feedback via the computing device in response to a stimulation applied by a user, wherein the tactile feedback is based on the variable frequency pattern.

According to an exemplary embodiment of the present invention, an article of manufacture comprises a computer readable storage medium comprising program code tangibly embodied thereon, which when executed by a computer, performs method steps for providing tactile feedback, the method steps comprising extracting a plurality of features from a visual representation of a physical object, wherein the extracting is performed using at least one image processing technique, generating a variable frequency pattern corresponding to the extracted features, sending the variable frequency pattern to a computing device, and generating the tactile feedback via the computing device in response to a stimulation applied by a user, wherein the tactile feedback is based on the variable frequency pattern.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which:

FIGS. 2A-2C are block diagrams illustrating image processing and frequency generation in a method for providing tactile feedback according to an exemplary embodiment of the invention.

FIG. 3 is a high-level block diagram illustrating a system for providing tactile feedback according to an exemplary embodiment of the invention.

DETAILED DESCRIPTION OF EXEMPLARY EMBODIMENTS

Exemplary embodiments of the invention will now be discussed in further detail with regard to a system and method for providing the sense of touch in a computing device, and, in particular, to a system and method for dynamically generating a frequency pattern to realize the sense of touch by leveraging vibration. This invention may, however, be embodied in many different forms and should not be construed as limited to the embodiments set forth herein.

The embodiments of the present invention describe devices, systems and methods through which computers and mobile devices, such as, for example, smartphones and tablets, can be improved to transmit realistic haptic feelings to users. While some of the embodiments of the present invention are described in connection with mobile devices and commerce, the embodiments of the invention are not necessarily limited thereto. For example, the haptic accessory discussed herein can be applied to other types of computing devices, such as, for example, desktop and laptop computers, and personal digital assistants (PDAs), and can be applied to other fields, such as, for example, the medical field. In the case of the medical field, a doctor located remotely from a patient may be able to use the devices, systems and methods of the embodiments of the present invention to examine patients and simulate feeling of patients' wounds or scars while not being physically present with the patient. It is to be understood that embodiments of the present invention are not limited to the retail and healthcare fields.

Embodiments of the present invention provide systems and methods to dynamically generate frequency patterns to help realize the sense of touch remotely in mobile or other computing devices by leveraging vibration to feel, for example, the texture of merchandise (e.g., sense of touch for cloth or leather. etc.) or the nature of a wound for a given patient who is remotely located from a physician by leveraging vibration capabilities of the mobile or other computing device. As a result, retail stores can provide a better shopping experience to their customers by allowing consumers to shop from any part of the world without being physically present in the store, attract more customers to shop from their online retail store, and enhance mobile subscribers' experiences by enabling them to feel the merchandise. In addition, patients can be provided with remote treatments in a tele-medicine type of a scenario.

Embodiments of the present invention provide systems and methods for dynamically generating frequency patterns for any of the given objects considering, for example, such attributes as texture, temperature, softness/hardness, stiffness, moisture content, swelling, color, size, etc. by applying the techniques such as Digital Image Processing (DIP).

Figure 1:
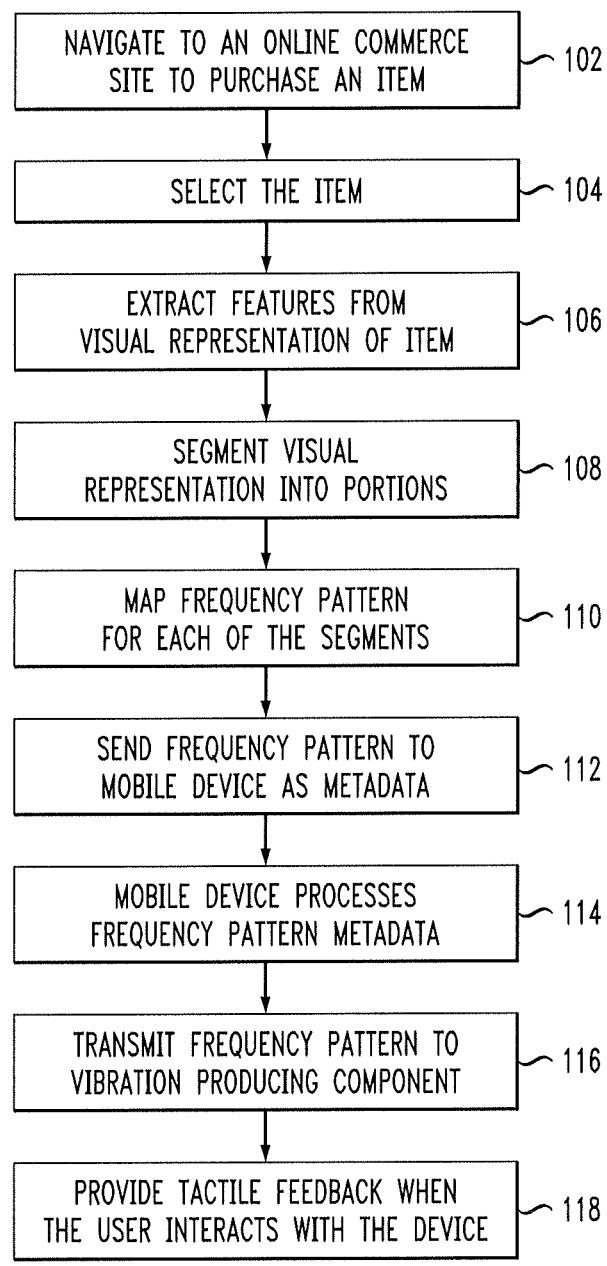
FIG. 1 is a flow chart illustrating a method for providing tactile feedback according to an exemplary embodiment of the invention.

Referring to FIG. 1, which illustrates a method for providing tactile feedback to a user, according to an embodiment of the present invention, a customer/mobile subscriber navigates to an online commerce site to purchase an item, e.g., a shirt (block 102). After browsing an online catalog, the customer selects the item, e.g., the shirt, for further viewing and information (block 104). The selection may yield a visual representation of the product, which can include and image and/or video that is displayed for the user. As an alternative, an individual may be in a store, or next to a patient to be examined, take a picture of a product in the store, or a part of the body of the patient to be examined using a camera, for example, on a mobile device, and send the taken picture to a user in the place of the customer/mobile subscriber described above.

Online commerce sites may allow a customer to click on details of an item to receive further information about the product. For example, in the case of an apparel item, a customer may receive the following data: size, color, availability, price, store location, picture of the item, shipping time, etc., which is sent to the mobile or other computing device as metadata. In accordance with embodiments of the present invention, one or more features of the product (e.g., texture, temperature, softness/hardness, stiffness, moisture content, swelling, color, size, etc.) are extracted from a visual representation of the product using, for example, digital image processing (DIP), digital image capture (DIC) and/or magnetic resonance imaging (MRI) techniques (block 106). The visual representation (e.g. image) is physically segmented into portions (block 108), and based on the extracted features, a frequency pattern is mapped for each of the segments (block 110), which can vary based on the differences between the extracted features at each segment. In an alternative embodiment, a frequency pattern can be generated from an image file associated with the subject item and/or a description of the subject item. The frequency pattern is sent to the mobile device or other computing device as metadata (block 112). According to an embodiment of the present invention, the extracted features and segmentation result in time-varying data values (e.g. in the form of a varying frequency pattern) associated with each physical haptic property of the product. The frequency pattern metadata is not visible to the user of the mobile or other computing device, but is processed by the mobile or other computing device (block 114), through, for example, an application, and transmitted to, for example, a vibration producing component of the mobile or other computing device capable of receiving variable frequency patterns (block 116) to provide the necessary tactile feedback when the user interacts with the mobile or computing device (block 118). According to an embodiment, the mobile or other computing device responds to pressure applied thereto by, for example, the finger of a user. In accordance with embodiments of the present invention, a customer can touch a screen at the point of display of the product or other portion of the mobile or other computing device to feel a texture of the product. As a non-limiting example, used solely for purposes of illustration and not limitation, embodiments of the present invention may be used in conjunction with and/or applied to the embodiments disclosed in the U.S. patent application Ser. No. 13/864,666, filed on Apr. 17, 2013, which is assigned to International Business Machines Corporation of Armonk, N.Y., USA, and titled "Haptic Accessory And Methods For Using Same", the complete disclosure of which is expressly incorporated herein by reference in its entirety for all purposes.

The pattern and amount of tactile feedback is a time-varying function of the time-varying data such that the pattern and amount of tactile feedback can be sufficient to identify the physical object. For example, the tactile feedback may have a multi-dimensional time varying pattern of vibration, such as, for example, a two-dimensional time-varying pattern of vibration. The mobile or other computing device converts the received variable frequency pattern to vibratory motion.

Figure 2A:
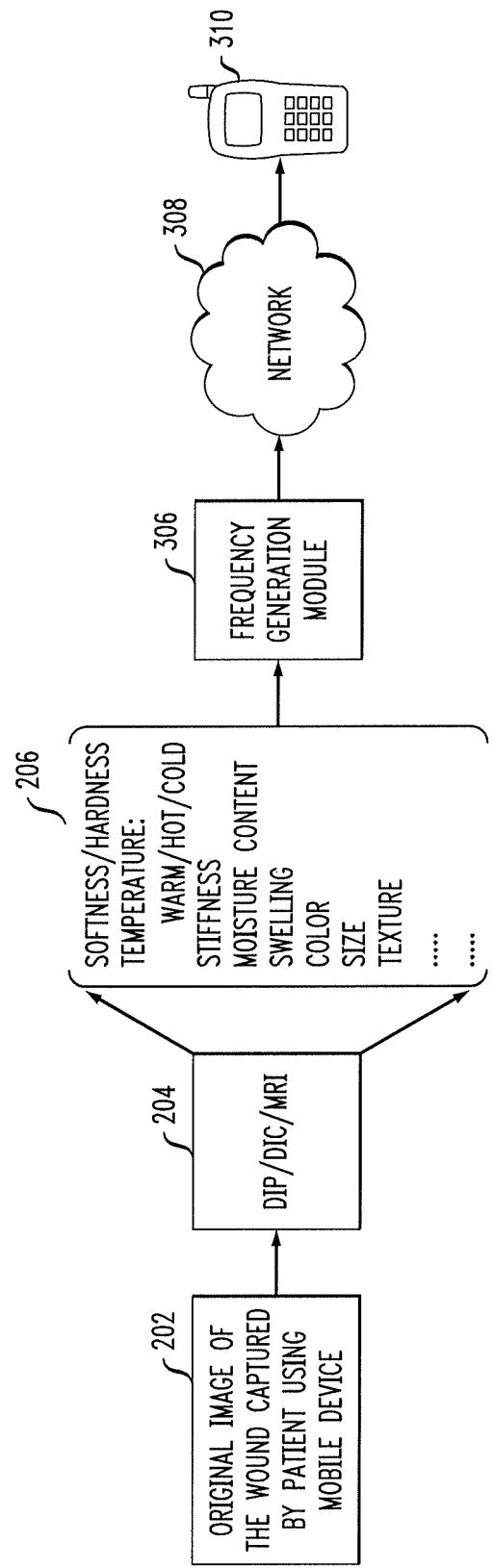
Figure 2B:
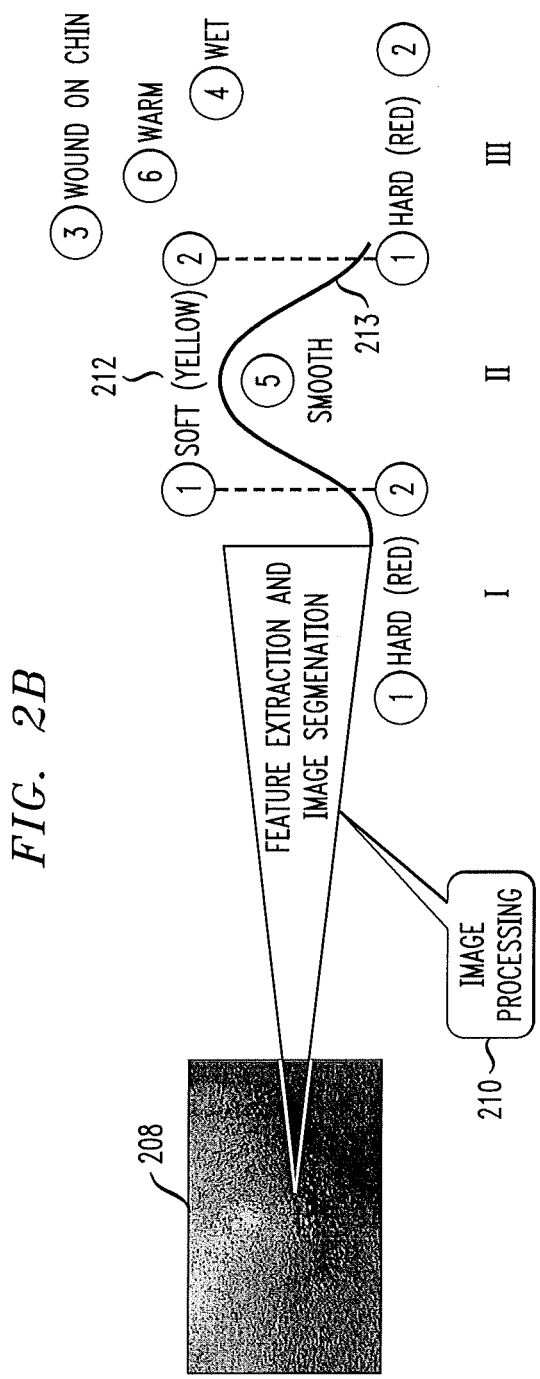

Referring to FIGS. 2A, 2B and 2C, steps 106, 108, 110 and 112 described in connection with FIG. 1 are described in more detail in connection with a scenario where an image of a wound/medical condition is captured by a patient using a mobile device. For example, referring to block 202, a patient who desires to show his wound to a physician remote from the patient takes a picture of the wound using a mobile device, and sends the image 208 via, for example, a network, to a remote server, for example, an online application server. As shown in FIG. 3, the remote server includes retrieval module 302 having an image processing module 304 and a frequency generation module 306. According to an embodiment, the frequency generation module 306 can be a dynamic frequency pattern generator.

Referring to blocks 204, 206, 208 210, as per step 106, one or more features of the wound (e.g., texture, temperature, softness/hardness, stiffness, moisture content, swelling, color, size, etc.) are extracted from the visual representation of the wound 208 by the image processing module 304 using, for example, DIP, DIC and/or MRI techniques. As per step 108, referring to the diagram at 212, using image processing techniques, the visual representation (e.g. image) 208 is physically segmented into portions based on location. For example, viewing from left to right, the image of the chin wound 208 is segmented into thirds I, II and III.

Referring to diagram 212 and Table 1 set forth below, as per block 110, the frequency generation module 306 maps a frequency pattern 213 corresponding to each of the extracted features for each of the segments I, II and III. In the diagram 212, the numbers 1-6 correspond to the numbers given to the attribute in Table 1.

| Attribute | Range | Weightage |
| --- | --- | --- |
| 1. Soft | Softness (0.1)←----→Hardness (1) | 0.5 |
| 2. Colour | Pale Yellow (0.1)←----→Red (1) | 0.3 |
| 3. Part of the body | Head (0.1)←----→Toe (1) | 0.3 |
| 4. Moisture | Wet (0.1)←----→Dry (1) | 0.2 |
| 5. Texture | Smooth (0.1)←----→Rough (1) | 0.5 |
| 6. Temperature | Cold (0.1)←----→Warm (0.5)←----→Hot (1) | 0.3 |

Referring to Table 1, which depicts a mapping of attributes to values, attributes such as softness/hardness, color, location on body, moisture, texture and temperature, are assigned values within a range of 0.1 to 1 corresponding to their actual characteristics. For example, softer, yellower, wetter, smoother and colder portions and portions closer to the head are assigned values nearer to 0.1, and portions that are harder, redder, dryer, rougher, hotter, and closer to the toes are assigned values nearer to 1. As described further below, the values of the attributes can differ depending on the segment. In other words, attributes or features of the item may vary at different portions of the item and the corresponding visual representation of the item. In addition, each attribute is given a weight based on an importance in connection with accurately identifying and presenting the haptic features of the particular item. The attribute and weight values can be user-defined, dynamically learned through, for example, learning algorithms based on use and results (e.g., using historical data, prior knowledge about how tactile feedback has been presented in connection with a particular item type), and/or a combination thereof. Referring to FIG. 2C, the frequency generation module 306 takes the processed attributes for segments I, II and III 214a, b, c, and referring to block 216, determines the weightage for each of the attributes, calculates the frequency value at each segment I, II and III using the values of the attributes at each segment appropriately modified by their weightages, and maps the frequency pattern 213 for each of the segment values. Frequency pattern persistence 217 referenced in the FIG. 2C is a persistent mechanism, for example, a database where the generated frequency pattern is stored so that it can be used for pattern learning processes.

As can be seen, the frequency pattern 213 varies based on the differences between the extracted features at each segment. For example, referring to diagram 212, in segment II, values for elements of the wound, such as, for example, color, hardness and texture, are different from those values in segments I and III. Accordingly, the mapped frequency at segment II is different from the mapped frequency at segments I and III. As per block 112, the frequency pattern 213 is sent to the mobile device 310 or other computing device via network 308 as metadata.

Referring to FIG. 3, a system 300 for providing tactile feedback to a user, according to an embodiment of the present invention, includes a retrieval module 302, including the image processing module 304, which extracts one or more features representing characteristics of the product or wound (e.g., texture, temperature, softness/hardness, stiffness, moisture content, swelling, color, size, etc.) from a visual representation of an item (e.g., a consumer product or medical condition, such as a wound), and physically segments the visual representation (e.g. image) into portions. The visual representation can be derived from, for example, an online commerce site product offering, or a taken picture of a product or a part of the body of a patient that is uploaded to the retrieval module 302 and sent to a user of the mobile device 310.

The retrieval module 302 also includes a frequency generation module 306, which, based on the extracted features, maps a frequency pattern corresponding to each of the segments. The retrieval module 302 sends the frequency pattern to the mobile device 310 or other computing device as meta data, and sends the visual representation to the mobile device 310. According to an embodiment, the retrieval module 302 is located at a remote server, such as an online application server, accessible via a network.

According to an embodiment of the present invention, the extraction and segmentation is performed using DIP, digital image capture (DIC) and/or magnetic resonance imaging (MRI), the mapping is performed by a dynamic frequency generator. The mapped variable frequency pattern includes time-varying data values associated with each physical haptic property of the product. The frequency pattern meta data is sent to the mobile device 310 via a network 308, such as a local area network (LAN), wide area network (WAN), cellular network, satellite network or the Internet, and is processed by a frequency processing module 312 which is electrically connected to and/or incorporated into the mobile device 310. According to embodiments, communication between the retrieval module 302 and the mobile device 310 can be via, for example, multimedia messaging and/or based on Wi-Fi, BLUETOOTH, GSM/CDMA, 2G, 3G, 4G, etc. technologies. Based on the frequency pattern received from the frequency generation module 306, the mobile device 310 or other computing device is able to generate the appropriate wave-like vibration patterns and/or control temperature so that the mobile device 310 or other computing device provides the necessary tactile feedback when the user interacts with the mobile device 310 or other computing device, or an accessory electrically connected to thereto. According to an embodiment, the wave-like vibration pattern corresponds to the frequency of each segment so that a user is able to feel the differences in the attributes at each respective portion of the item.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1, 2A-2C and 3 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 4:
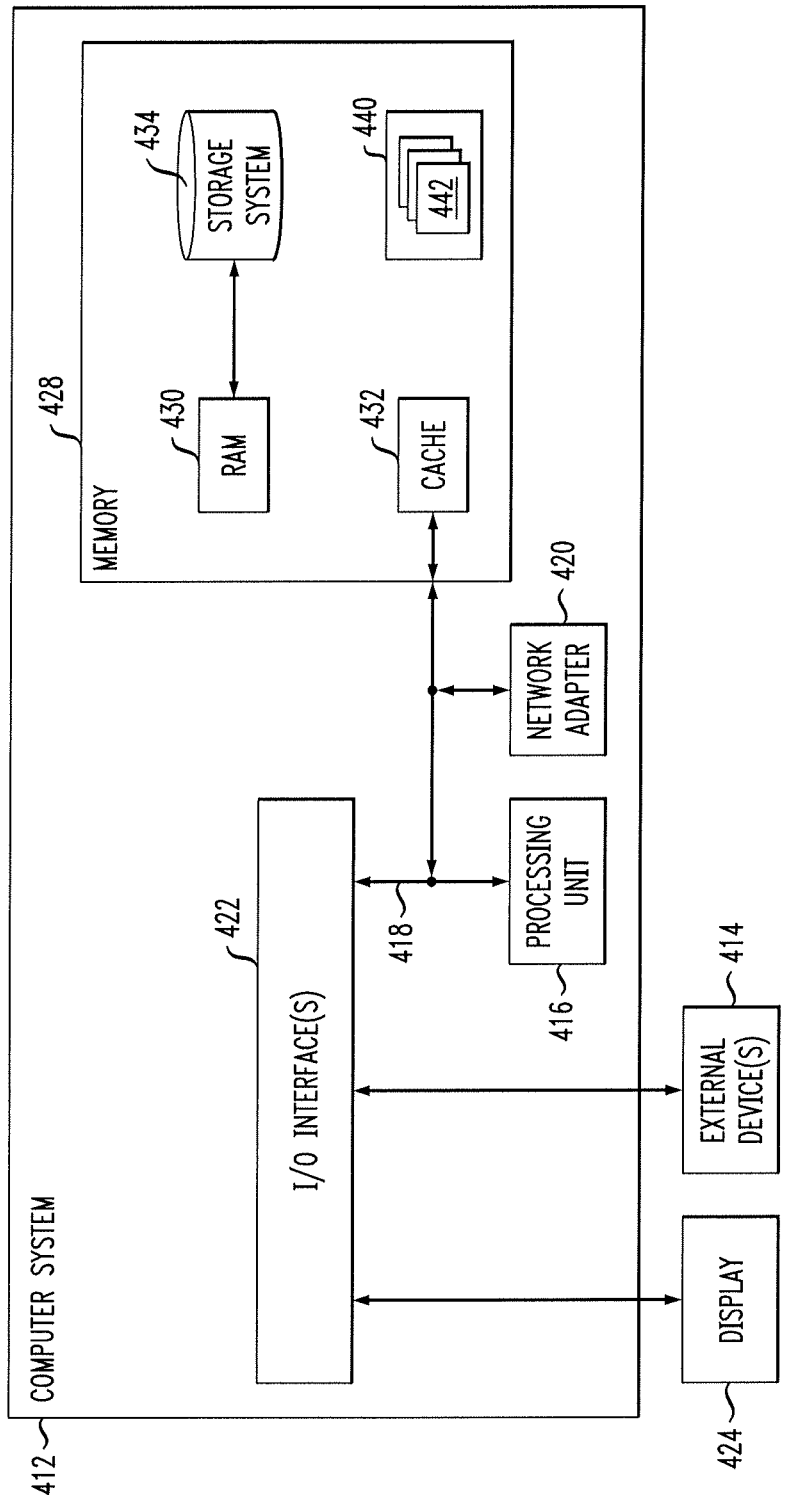
FIG. 4 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 4, in a computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

The bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 412 typically includes a variety of computer system readable media. Such media may be any available media that is accessible by computer system/server 412, and it includes both volatile and non-volatile media, removable and non-removable media.

The system memory 428 can include computer system readable media in the form of volatile memory, such as random access memory (RAM) 430 and/or cache memory 432. The computer system/server 412 may further include other removable/non-removable, volatile/nonvolatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 418 by one or more data media interfaces. As depicted and described herein, the memory 428 may include at least one program product having a set (e.g., at least one) of program modules that are configured to carry out the functions of embodiments of the invention. A program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc., one or more devices that enable a user to interact with computer system/server 412, and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for providing tactile feedback, comprising:
an image processing module capable of extracting a plurality of features from a visual representation of a physical object, wherein the extracting is performed using at least one image processing technique; and
a frequency generation module capable of generating a variable frequency pattern corresponding to the extracted features, sending the variable frequency pattern to a computing device, assigning values within a range for each of the plurality of features, and weighting the values;
wherein the values correspond to actual characteristics of the physical object;
wherein weights applied to the values are based on an importance of each value in connection with accurate identification of the extracted features of the physical object via the tactile feedback; and
wherein the computing device generates the tactile feedback in response to a stimulation applied by a user, and the tactile feedback is based on the variable frequency pattern.

2. The system of claim 1, wherein:
the image processing module is capable of segmenting the visual representation into a plurality of portions;
the frequency generation module is capable of calculating a frequency value for each of the plurality of portions based on the weighted values; and
a weighted value for an actual characteristic of the physical object in a first portion of the plurality of portions differs from a weighted value for the actual characteristic in a second portion of the plurality of portions.

3. The system of claim 2, wherein the frequency generation is capable of mapping the variable frequency pattern for each frequency value of the plurality of portions.

4. The system of claim 1, wherein the frequency generation module is capable of sending the variable frequency pattern to the computing device as meta data.

5. The system of claim 1, wherein the tactile feedback comprises a vibration corresponding to the variable frequency pattern.

6. The system of claim 1, wherein the extracted features comprise at least one of texture, temperature, softness/hardness, moisture content, color and size.

7. The system of claim 1, wherein the computing device is a mobile device.

8. The system of claim 1, wherein:
the image processing module is capable of segmenting the visual representation into a plurality of portions; and
the frequency generation module is capable of calculating a frequency value for each of the plurality of portions corresponding to the extracted features, and mapping the variable frequency pattern for each frequency value of the plurality of portions.

9. The system of claim 1, wherein:
the image processing module is capable of segmenting the visual representation into a plurality of portions; and
a weighted value for an actual characteristic of the physical object in a first portion of the plurality of portions differs from a weighted value for the actual characteristic in a second portion of the plurality of portions.

10. The system of claim 1, wherein the weights are dynamically learned.

11. An article of manufacture comprising a non-transitory computer readable storage medium comprising program code tangibly embodied thereon, which when executed by a computer, performs method steps for providing tactile feedback, the method steps comprising:
extracting a plurality of features from a visual representation of a physical object, wherein the extracting is performed using at least one image processing technique;
generating a variable frequency pattern corresponding to the extracted features;
sending the variable frequency pattern to a computing device;
assigning values within a range for each of the plurality of features, wherein the values correspond to actual characteristics of the physical object;
weighting the values, wherein weights applied to the values are based on an importance of each value in connection with accurate identification of the extracted features of the physical object via the tactile feedback; and
generating the tactile feedback via the computing device in response to a stimulation applied by a user, wherein the tactile feedback is based on the variable frequency pattern.

12. The article of manufacture of claim 11, wherein the weights are dynamically learned.

* * * * *